April 16, 1935.  M. C. WILKINSON  1,997,893
NAVIGATIONAL INSTRUMENT
Filed Sept. 16, 1932  3 Sheets-Sheet 3
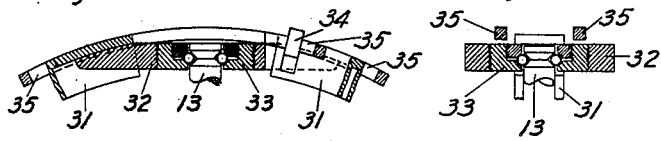
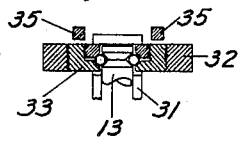
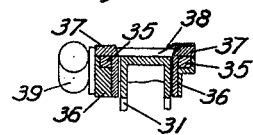
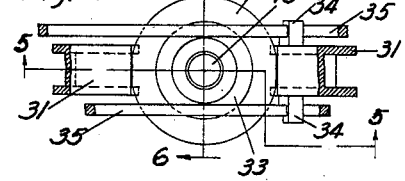
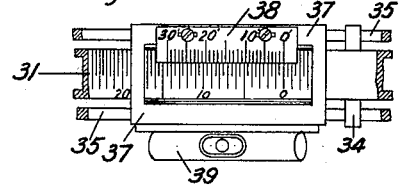
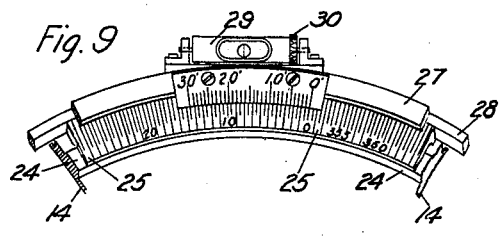
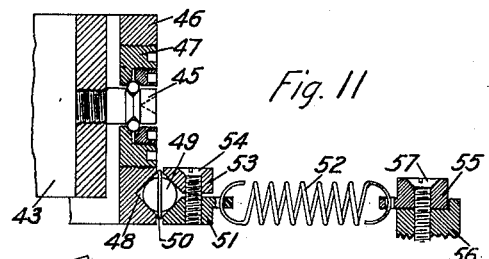
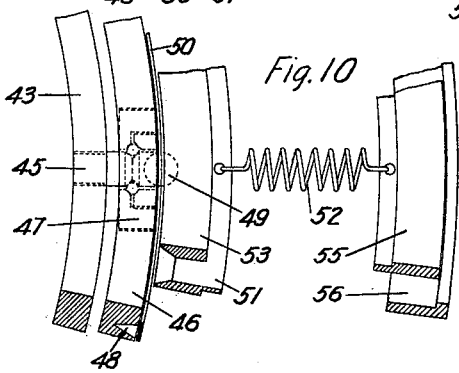
INVENTOR
Melville Cary Wilkinson.

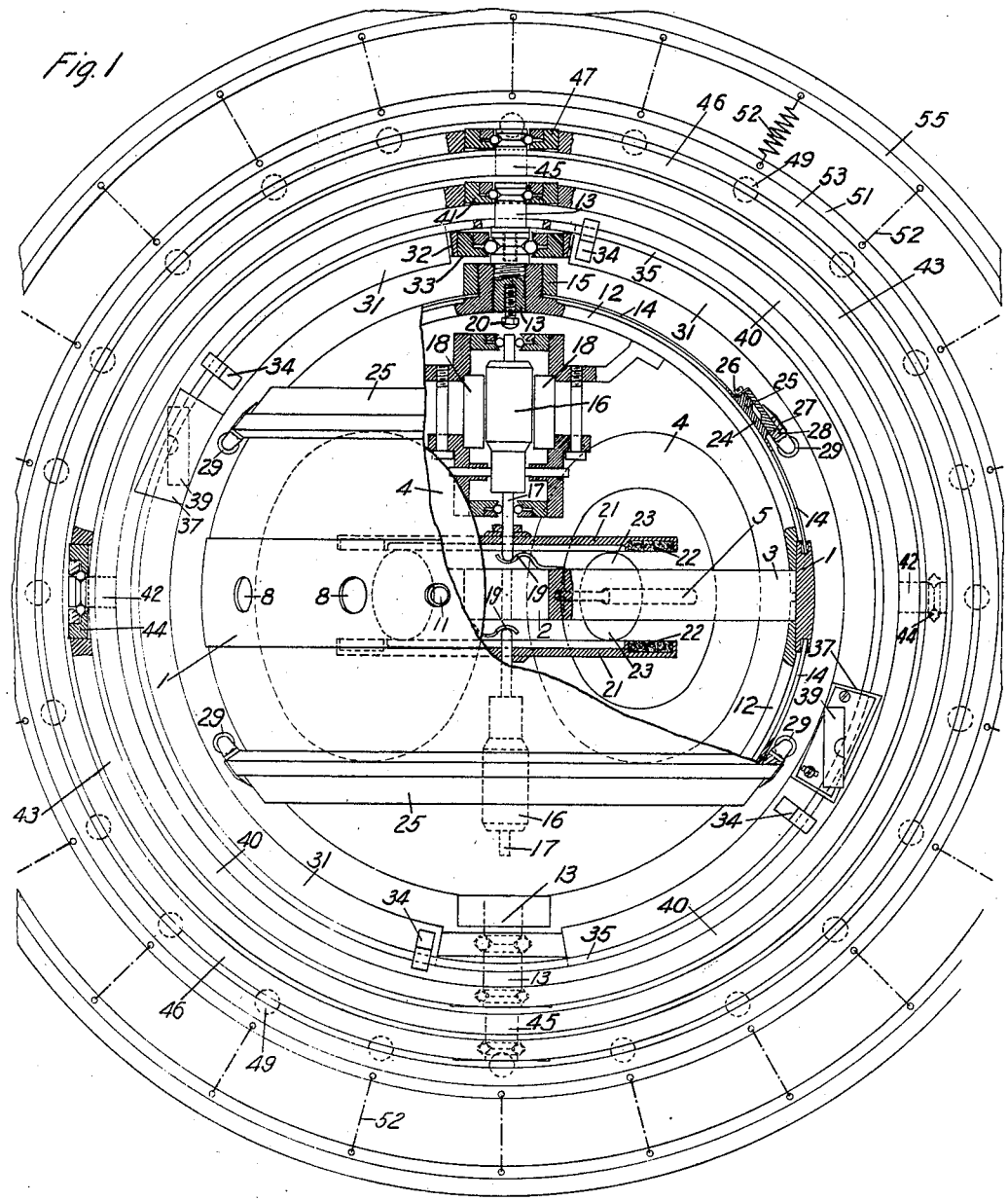

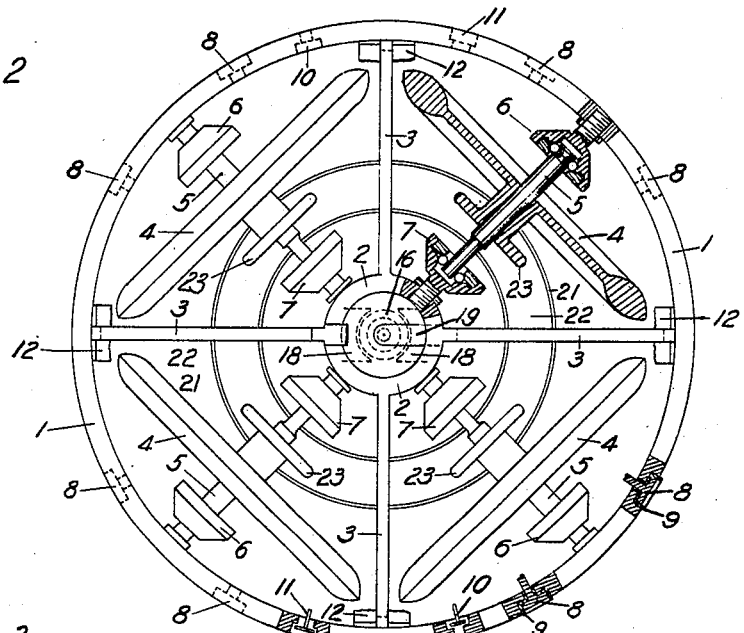
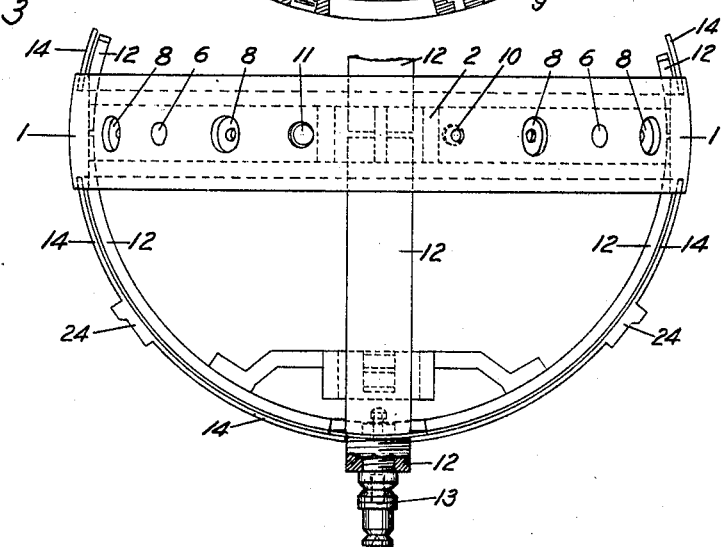

Patented Apr. 16, 1935

1,997,893

UNITED STATES PATENT OFFICE 1,997,893

NAVIGATIONAL INSTRUMENT

Melville Cary Wilkinson, Los Angeles, Calif., assignor to Eugene Overton, Los Angeles, Calif.

Application September 16, 1932, Serial No. 633,480

8 Claims. (Cl. 33—204)

The invention relates to a mechanism from which data determining latitude and longitude can be obtained when astronomical means for so doing are not obtainable.

Certain fixed principles are involved. There must be a gyroscopically controlled element oriented in space, on the axis of which the supporting element must be free to revolve. The supporting element must have free rotation about 3 axes spaced 90 degrees apart. There must be a common point which must be the center of gravity of both aforesaid elements and through which said point the 4 axes of rotation must pass. All parts utilized must be balanced in themselves, with friction reduced to a minimum. The gyros must have full control of movement in all parts whose center of gravity and axes of rotation are contained in the aforesaid common point.

Other objects are, accurately determining the true meridian at all times, determining the direction and velocity of the wind during travel and obtaining data to plot the true course of travel followed.

One form of the invention, particularly for use in aviation, is illustrated in the accompanying drawings, in which Fig. 1 is a general view, partly in section, showing the interrelation of the principal parts of the mechanism. Fig. 2 is a plan view of the gyroscopically stabilizing element of the mechanism. Fig. 3 is a partial side view of Fig. 2 with one, only, of the two similar mounting elements and motor supports. Fig. 4 is a plan view of the mounting of the latitude ring upon the trunnions of the gyrosphere. Fig. 5 is a section on the line 5—5 of Fig. 4. Fig. 6 is a section on the line 6—6 of Fig. 4. Fig. 7 is a developed plan of the latitude determining device. Fig. 8 is a partial transverse section of Fig. 7. Fig. 9 is a diagrammatic perspective view of the longitude determining device. Fig. 10 is a plan view of a short section showing the middle ring and trunnion by which it is connected to the outer gimbal ring, and the outer gimbal ring including its ball bearing and spring mounting and part of its support on the carrying vehicle. Fig. 11 is a cross section of Fig. 10.

To better illustrate its workings, the instrument may be divided into two parts, calling that part which is held oriented by the gyroscopes the "gyrosphere" and the supporting parts the "mounting", the line of demarcation being between trunnions 13 and bearings 41.

Describing the "gyrosphere", the stabilizing element, Fig. 2, consists of an outer or equatorial ring 1, inside of which is concentrically mounted an inner ring, 2, by means of supports, 3, spaced equally apart in the equatorial plane. Intermediate these supports are mounted gyroscope wheels 4, the axes, 5, of which have their outer thrust ball bearings, 6, secured to the outer ring, 1, and the inner, radial ball bearings, 7, secured to the inner ring, 2; these axes, 5, lie in the equatorial plane thereby causing wheels, 4, to rotate in planes perpendicular thereto; the thrust and radial bearings, 6 and 7, allow for temperature changes which might affect the couple balance due to gravity. (The actions of the gyroscopes will be explained later.)

Electrical contact discs, 8, are symmetrically spaced around the outer ring, 1, and insulated therefrom by insulators, 9, alternate discs are electrically connected to two bus wires (not shown) inside the gyrosphere. Attached to these bus wires are electrical connections to the motors. A multiplicity of contacts, 8, are used for convenience in making contact to the bus wires, with contact brushes attached to the source of power supply when the gyroscope is in a position which would prevent contacts being made with certain discs. On opposite sides of the ring, 1, inlet valves, 10, and outlet valves, 11, are placed, their functions will be explained later.

The ring, 1, is supported between two spider-like members, 12, which have the ends of their legs slotted to fit over the supports, 3, at their junction with ring, 1, and secured to ring 1. The center-lines of these members, 12, coincide with a line passing through the center of gravity of the stabilizing element, said line being perpendicular to the equatorial plane containing the axes, 5, of the gyroscopes; these members are shown in Figs. 1, 2 and 3. The members 12 have bosses on the center line thereof clearly shown in Fig. 1, which are drilled and threaded on the inside to receive the ends of the polar trunnions, 13, (which may be sectionalized as shown for construction purposes) and threaded on the outside to receive proper nuts, 15, to secure the two hemispherical casings, 14, in place against shoulders on members, 12, and also the edges of members, 14, in concentric slots in the edges of ring 1. All joints and parts of casings are rendered air tight by rubber cement.

On the center-line inside each member, 12, and attached thereto, is mounted an electric motor, the armatures, 16, of which rotate between the pole pieces, 18; the armature shafts, 17, carry disc drive wheels, 21, having friction drive surfaces, 22, adapted to transmit motion generated by the motor to driven wheels, 23, mounted on axes, 5, of the gyroscopes. When the motor is not energized the springs, 19, cause the shafts, 17, to move away from each other and rest against the stops, 20, thereby disengaging the surface, 22, of the driving wheels from the driven wheels, 23. When the motors are energized the magnetic action of the fields attracts the armature cores toward central positions between the pole pieces, 18, causing the armature shafts to move towards each other and compress springs, 19, thereby bringing driving and driven wheels into contact, so that the rotative motion of the motor armature is transmitted to the gyroscopes. By driving the gyroscopes from diametrically opposite points there is no tendency to cause the gyroscopes to leave their planes of rotation.

By making contact with fine wire brushes, connected to an electric power supply, to adjoining contacts, 8, in ring, 1, the bus wires are energized and the motors connected thereto are caused to function irrespective of polarity.

The motors may also be energized by bringing the electricity into the gyrosphere through the mounting rings and trunnions and a time clock used to energize the motors at given times.

It is not necessary, or desirable to drive the gyroscopes continuously while the mechanism is functioning, but to do so occasionally and thereby maintain the speed of the gyroscopes above the minimum necessary to function, as determined when testing each instrument.

On the outside surfaces of the hemispherical members 14 are rings, 24, made integral with said members; these rings, 24, lie in a plane perpendicular to the polar axis of the gyrosphere and parallel to the equatorial plane containing the axes, 5, of the gyroscopes, and correspond to circles of equal altitude on the earth, Figs. 1, 3 and 9. Superimposed on these rings are rings, 25, secured concentrically thereto by screws, 26, Fig. 1, spaced around the ring to perform that function. On the exterior surfaces of these rings, 25, are longitude scales divided into 359 equal spaces and numbered from 0 to 359, as shown in Fig. 9. On the extreme outside edges of these rings, 25, two other rings, 27 and 28, are placed and secured together, the cross-sections of said rings being such that when they are joined, the two form one complete ring having a re-entrant angle which fits over and upon and is slidably movable circumferentially around the outer edge of ring 25 by tapping lightly with a pencil or with an electric hammer on the vernier or level bubble in the direction required. On the combined rings, 27 and 28, are mounted level-bubbles, 29, whose longitudinal axes lie in a plane parallel to and tangent to rings 25; level-bubble casings have knurled surfaces, 30, Fig. 9 by which the level-bubbles may be rotated on their longitudinal axes so that they can be levelled crosswise to a plane parallel to the horizontal plane of the earth where the instrument is situate. On the combined rings, 27 and 28, are also mounted verniers by which the scale on the surface of rings 25 may be read to smaller divisions.

On the trunnions, 13, of the gyrosphere, Figs. 1, 4, 5 and 6, in suitable bearings thereon, is mounted a latitude ring, 31, having two similar scales of 90 degrees marked on the face thereof at diametrically opposite locations, see Fig. 7, this ring has hubs 32 with bearings 33 contained therein permitting the ring to revolve freely on the trunnions. Mounted on either side of and supported by, and slidably movable circumferentially in brackets, 34, which are secured to ring 31, are two rings, 35, mutually parallel and parallel to ring 31. Said rings, 35, extend past the trunnions 13 on opposite sides thereof and at a distance therefrom to allow for adjustments of the bearings 33. Mounted upon and secured to these rings 35, at diametrically opposite points, by clamps 36, are two carriages, 37, so arranged that when one carriage is moved circumferentially by tapping lightly with a pencil or with an electric hammer on the carriage in the direction required, the opposite carriage also moves a like amount, thereby balancing the rings at the center of gravity of the gyrosphere. On carriages 37 are secured verniers 38, Figs. 7 and 8, by which the scales may be read to smaller divisions. Owing to trunnion interference, the scales on the face of ring 31 are shifted in a negative direction to permit polar latitudes thereon to be read by the verniers. Level-bubbles, 39, are adjustably mounted on the sides of the carriages, 37, Fig. 1, by means of a pivot screw and a screw in a slot, so that the bubble is centered at the time the zero of the vernier is opposite the zero of the scale, when the instrument is situated on the equator. This gyroscopic element complies in all ways with the fixed principles involved in the gyroscopically controlled element in space.

Referring to the "mounting"—the inner gimbal ring 40, Fig. 1, has two bearings, 41, at diametrically opposite points thereof adapted to receive the outer ends of the trunnions, 13, and support the gyrosphere. 90 degrees circumferentially from these bearings are two trunnions, 42, projecting outwardly, the center-line of these trunnions passes through the center of gravity of the gyrosphere; middle gimbal ring 43 has two bearings 44 at diametrically opposite points thereof adapted to receive the outer ends of trunnions, 42, and support the ring, 40. 90 degrees circumferentially from these bearings are two trunnions, 45, projecting outwardly, the center-line of said trunnions also passes through the center of gravity of the gyrosphere. The outer gimbal ring, 46, has two bearings 47, Figs. 1, 10 and 11, at diametrically opposite points which are adapted to receive the outer ends of trunnions 45. On the outer face of ring 46 is a groove, 48, shaped to form the inner race of a ball bearing, in this race, balls, 49, are placed and spaced apart circumferentially by a spacing ring, 50. One half of the outer race consists of the inner slant face of ring 51, the other half of said outer race is formed by the inner slant face of ring 53, said ring 53 being secured to ring 51 by screws 54. Springs 52 are attached by their inner ends to a perforated web forming a part of ring 51, and their outer ends to a ring, 55, by means of a perforated rib forming a part of ring 55. Ring 55 is mounted on the carrying vehicle and ring 55 is attached thereto by screws 57.

The ball bearing, of which balls 49 form a part, lies in the plane of ring 46 and allows ring 46 to rotate on its polar axis, which said axis passes through the center of gravity of the gyrosphere. These rings comply in all ways with the fixed principles involved in the support.

Springs 52 function to prevent vibration from being transmitted from the carrying vehicle to the working parts of the instrument.

Ball bearings, where necessary for balancing members, are adjustable endways.

All trunnions and shafts have centering recesses in the ends thereof for balancing purposes as shown in Fig. 11 by dotted lines in the trunnion, 45.

Referring to the true actions of a gyroscope: A gyroscope when functioning tends to maintain its axis directionally in space. This axial direction refers to the stellar system and not to the earth, if the axis of rotation is perpendicular to the equatorial plane, the axis will point toward the true north (incidentially will be parallel to the earth's axis of rotation) and remain oriented in that direction. But the gyroscope has no directional control in the space horizontal direction at right angles thereto.

Should the axis of the gyroscope be shifted through an angle of 90 degrees from the true north, its axis will lie in a space equatorial plane and point in a given fixed direction in said space equatorial plane.

A plane requires that two straight lines may be drawn therein intersecting each other at an angle. To establish a plane in space by gyroscopic action requires at least two gyroscopes whose axes intersect and lie in the same plane. The nearer 90 degrees that these axes intersect, the greater the stability of said plane.

This arrangement of gyroscopes admits of their entire power being utilized in maintaining their direction in space and prevents rotation in space.

Should two such aforesaid gyroscopes be mounted in a frame that is freely revoluble in all directions when attached to a vehicle on the earth, the frame too, will remain oriented in space and constitute a datum from which the revolution of the earth is measurable, the earth making one complete revolution therewith in one space, or sidereal, day.

Also, if this frame remain oriented in space all other points in the stellar system retain their relative position in regard to this frame.

Referring to the inlet valves 10 and outlet valves 11, Fig. 2, these valves are for the following purpose. In using gyroscopes, windage loss is an important factor, this loss is caused by impact of the molecules of the air against the gyroscope wheel which takes energy in the form of motion from the wheel and transfers it to the air. It has been customary to operate gyroscopes in a partial vacuum, this partial vacuum is hard to maintain. To overcome this difficulty I operate the gyroscopes in hydrogen gas, at or below atmospheric pressure, the molecular weight of hydrogen being so much less than that of air, that when gyroscopes are operated therein, the windage loss is reduced to about one-seventh of that of air, this is equivalent to operating the gyroscopes in a partial vacuum in air of about two pounds pressure absolute.

Referring to the scale markings on the longitude rings 25, Fig. 9, this marking approximates almost exactly the lag of the mean solar day over the sidereal day. By its use, and two constants, one of 1 degree added when the scale reading passes the 0 degree mark, and the other of one minute added to its reading for each 24 hour period after the first 24 hours after the instrument is set (accurate to within one second of arc for each day), the rotation of the earth on its axis relative to the stellar system can be read in mean solar time, and these readings corrected, for time, with the aid of a chronometer, will change these readings into longitude readings.

No pressure operated device is practical for the shifting of the verniers on the latitude and longitude scales because their use involves the element of time, which would tend to shift the orientation of the gyrosphere. The method that obviates this disturbance is to tap the carriage or vernier lightly with a pencil or other light object in the direction required to center the bubble, or use a vibrator of high frequency having a light hammer attached to the vibrating member thereof, using the inertia of the mass of the gyrosphere to hold it oriented while the indicating devices are being shifted.

In setting and operating the instrument, hydrogen gas is introduced into the gyrosphere driving out the air therein and substituting the hydrogen gas. The instrument is then set in a framework, astronomically located, having opposing lathe centers therein which are collinear with the true north; these lathe centers are entered in the conical depressions in the ends of the trunnions, 13, 15 and support the gyroscope thereon with its axis of rotation in the direction of the true north.

The latitude ring is then rotated into the meridional plane, the vernier thereon set at the predetermined latitude of the framework site where the level-bubble should read "center" to verify its original setting. The longitude vernier is then moved until its level-bubble is centered and the gyrosphere rotated thereunder so that the vernier reads the correct longitude of the site when corrected for time by the chronometer. Electric contact is then made to energize the motors and bring the gyroscopes up to speed. The instrument is then removed and secured in its support in the carrying vehicle. A proper record of the time of setting is made so that the time for adding the constants of one hour and one minute can be made at the proper time.

For obtaining the direction and velocity of the wind when flying blind, a reading for latitude and longitude is taken; using these data plotted as a starting point. At the end of a period of time a position by dead-reckoning is plotted and another reading for latitude and longitude is taken and plotted; a line joining these two plotted points gives the direction and its length gives the velocity of the wind.

The true north is always indicated by the plane of the latitude ring when it is in the meridional plane.

Having thus described my invention, I claim:

1. In a navigational instrument such as described, an orientable element, opposed trunnions mounted on said element, a second element consisting of a universally rotatable balanced three-ring gimbal system, said orientable element being mounted in the inner ring of said gimbal system by means of said trunnions, the outer ring being mounted upon a carrying vehicle capable of being moved over the surface of the earth; gyroscopes mounted in said orientable element having axes normal to the center line of said trunnions, driven discs fixed to the rotors of said gyroscopes, motors mounted in said orientable element, said motors having shafts normal to the gyroscope axes and movable endwise to predetermined positions, driving discs mounted on said motor shafts adapted to make contact with and transmit rotation to all of said driven discs when said motor shafts are shifted endwise to the contact position; indicating devices mounted on said orientable element whereby the geographical position of the carrying vehicle can at any time be determined as said element maintains a fixed orientation relatively to the stellar system.

2. In a navigational instrument such as described, an orientable element maintaining a fixed orientation relatively to the stellar system, opposed trunnions mounted on said element, a second element consisting of a universally rotatable balanced three-ring gimbal system, said orientable element being mounted in the inner ring of said system by means of said trunnions, the outer ring being mounted upon a carrying vehicle, circular longitude scales mounted on said orientable element in planes perpendicular to the center line of said trunnions, said scales being divided into 359 equal spacings, rings circumferentially movably mounted on said scales, level-bubbles mounted on said rings, verniers mounted on said rings for cooperation with their associated scales; said scales when a level-bubble is centered and the scale reading corrected for time, indicating the geographical longitude of the carrying vehicle.

3. In a navigational instrument such as described, an orientable element maintaining a fixed orientation relatively to the stellar system, opposed trunnions mounted on said element, a second element consisting of a universally rotatable balanced three-ring gimbal system, said orientable element being mounted in the inner ring of said system by means of said trunnions, the outer ring being mounted upon a carrying vehicle; gyroscopes mounted in said orientable element, driven discs fixed to the rotors of said gyroscopes, electric motors mounted in said orientable element, said motors having armature shafts movable endwise to predetermined positions, driving discs securely mounted on said motor shafts to transmit rotation to said driven discs when driving and driven discs are engaged, springs mounted in said orientable element, said springs adapted for holding said driving discs out of engagement with said driven discs when the motors are not energized, magnetic means for compressing said springs and bringing said driving discs into engagement with said driven discs when the motors are energized; indicating devices mounted on said orientable element whereby the geographical position of the carrying vehicle can at any time be determined.

4. In a navigational instrument such as described, an orientable element maintaining a fixed orientation relatively to the stellar system, opposed trunnions mounted on said element, a second element consisting of a universally rotatable balanced three-ring gimbal system, said orientable element being mounted in the inner ring of said system by means of said trunnions, the outer ring being mounted upon a carrying vehicle; a latitude ring rotatably mounted on said trunnions, the plane of said ring containing the center line of said trunnions, scales on said ring, said scales having similar markings diametrically opposite each other, connecting rings slidably, movably, circumferentially mounted on said latitude ring, two carriages mounted on said connecting rings diametrically opposite each other, level-bubbles mounted on said carriages, verniers mounted on said carriages for cooperation with their associated scales, said indicating devices, when a level-bubble is centered, indicating the geographical latitude of the carrying vehicle.

5. In a navigational instrument such as described, an orientable element maintaining a fixed orientation relative to the stellar system, opposed trunnions mounted on said element, a second element consisting of a universally rotatable balanced three-ring gimbal system, said orientable element being mounted in the inner ring of said system by means of said trunnions the outer ring being mounted upon a carrying vehicle; circular longitude scales mounted on said orientable element in planes perpendicular to the center line of said trunnions, said scales being divided into equal spacings, rings circumferentially movably mounted on said scales, level indicating means mounted on said rings, verniers mounted on said rings for cooperation with their associated scales; a latitude ring rotatably mounted on said trunnions the plane of said ring containing the center line of said trunnions, scales on said ring, said scales having similar markings diametrically opposite each other, connecting rings slidably movably circumferentially mounted on said latitude ring, two carriages mounted on said connecting rings diametrically opposite each other, level indicating means mounted on said carriages, verniers mounted on said carriages for cooperation with their associated scales; said indicating devices, when their level indicating means are centered and the longitude scale corrected for time, indicating the geographical location of the carrying vehicle.

6. In a navigational instrument such as described, an orientable element maintaining a fixed orientation relatively to the stellar system, opposed trunnions mounted on said element, a second element consisting of a universally rotatable balanced 3 ring gimbal system, said orientable element being mounted in the inner ring of said system by means of said trunnions, the outer ring being mounted upon a carrying vehicle; gyroscopes, all having their spin axes in a common plane, mounted in said orientable element, means for rotating said gyroscopes consisting of driven discs mounted integral with each respective gyroscope, motors mounted in said orientable element for rotating said gyroscopes, each motor having a friction driving disc mounted on its shaft for simultaneous frictional engagement with all driven discs, said driving discs making contact on said driven discs at diametrically opposite points on said driven discs; said orientable element having indicating devices mounted thereon whereby the geographical position of the carrying vehicle can at any time be determined.

7. In a navigational instrument such as described, an orientable element maintaining a fixed orientation relatively to the stellar system, opposed trunnions mounted on said element, a second element consisting of a universally rotatable balanced three-ring gimbal system, said orientable element being mounted in the inner ring of said system by means of said trunnions, its outer ring being mounted upon a carrying vehicle; circular scales mounted on said orientable element in planes perpendicular to the center line of said trunnions, rings slidably movably circumferentially mounted on said scales, level-bubbles mounted on said rings, verniers mounted on said rings for cooperation with their associated scales; a ring rotatably mounted on said trunnions, the plane of said ring containing the center line of said trunnions, scales on said ring, connecting rings slidably movably circumferentially mounted on said ring, carriages mounted on said connecting rings, level-bubbles mounted on said carriages, verniers mounted on said carriages for cooperation with their associated scales; all rings slidably movably circumferentially, together with all devices thereon, adapted to being moved by impact; said scales, when the level-bubbles are centered and the longitudinal scale reading corrected for time, indicating the geographical location of the carrying vehicle.

8. In a navigational instrument such as described, an orientable element adapted to be maintained in an oriented position relatively to the stellar system, gyroscopes mounted in said element, electric motors mounted in said element, opposed supporting trunnions mounted on said element, a latitude ring mounted on said trunnions the plane of said ring containing, and being revoluble on, the center line of said trunnions, scales on said latitude ring, connecting rings mounted on said latitude ring, carriages mounted on said connecting rings, level-bubbles mounted on said carriages, verniers mounted on said carriages for cooperation with their associated scales; circular longitude scales mounted on said orientable element in planes perpendicular to the center line of said trunnions, rings mounted on said longitude scales, level-bubbles mounted on said rings, verniers mounted on said rings for cooperation with their associated scales; a second element consisting of a universally rotatable balanced three-ring gimbal system, said inner ring of said system having two axes of rotation spaced 90 degrees apart lying in the plane of said ring and having trunnions mounted on one of said axes of rotation, said orientable element being mounted in said inner ring by means of its trunnions on one of said axes of rotation, said inner ring being mounted by means of said trunnions in a middle ring, said middle ring having two axes of rotation spaced 90 degrees apart lying in the plane of said ring and having trunnions mounted on one of said axes of rotation, said middle ring being revolubly mounted by means of said trunnions in an outer ring, said outer ring having one axis of rotation lying in the plane of said outer ring to receive the trunnions mounted on the middle ring and a second axis of rotation perpendicular to its plane at the center of said outer ring, said outer ring being mounted on and revoluble about its second axis of rotation in a ring attached, preferably by springs, to a carrying vehicle; all axes of rotation of said orientable element and said three rings being concurrent in a given point which is also their mutual center of gravity; said scales and their indicating devices being adapted to determine the geographical position of said carrying vehicle.

MELVILLE CARY WILKINSON.